United States Patent
Hofmann et al.

(10) Patent No.: US 9,704,230 B2
(45) Date of Patent: Jul. 11, 2017

(54) FEEDBACK TO USER FOR INDICATING AUGMENTABILITY OF AN IMAGE

(75) Inventors: Klaus Michael Hofmann, Amsterdam (NL); Vladimir Nedovic, Amsterdam (NL)

(73) Assignee: LAYAR B.V., Amsterdam (NL)

(*) Notice: Subject to any disclaimer, the term of this patent is extended or adjusted under 35 U.S.C. 154(b) by 333 days.

(21) Appl. No.: 14/348,090

(22) PCT Filed: Sep. 30, 2011

(86) PCT No.: PCT/EP2011/067138
§ 371 (c)(1),
(2), (4) Date: Dec. 3, 2014

(87) PCT Pub. No.: WO2013/044983
PCT Pub. Date: Apr. 4, 2013

(65) Prior Publication Data
US 2015/0109337 A1 Apr. 23, 2015

(51) Int. Cl.
*G06T 7/00* (2017.01)
*G06T 19/00* (2011.01)

(52) U.S. Cl.
CPC .......... *G06T 7/0002* (2013.01); *G06T 19/006* (2013.01); *G06T 2200/24* (2013.01); *G06T 2207/10004* (2013.01); *G06T 2207/30168* (2013.01)

(58) Field of Classification Search
CPC .................................................. G06T 19/006
See application file for complete search history.

(56) References Cited

U.S. PATENT DOCUMENTS

| | | | |
|---|---|---|---|
| 2006/0038833 A1* | 2/2006 | Mallinson | A63F 13/02 345/633 |
| 2007/0050237 A1* | 3/2007 | Tien | G06Q 10/00 705/7.39 |
| 2007/0115372 A1 | 5/2007 | Wu | |
| 2008/0071559 A1* | 3/2008 | Arrasvuori | G06Q 30/06 705/26.1 |
| 2009/0067726 A1 | 3/2009 | Erol | |
| 2010/0313113 A1* | 12/2010 | Chen | G06F 17/30241 715/230 |

(Continued)

FOREIGN PATENT DOCUMENTS

EP 2285097 2/2011

OTHER PUBLICATIONS

Bordallo Lopez, Miguel; Hannuksela, Jari; Silven, J. Olli; Vehvilainen, Marku: "Multimodal sensing-based camera applications", Multimedia on Mobile Devices 2011; vol. 7881, Jan. 25, 2011, pp. 788103-1-788103-9.

(Continued)

*Primary Examiner* — Charles Tseng
(74) *Attorney, Agent, or Firm* — Steven M. Koehler; Westman, Champlin & Koehler, P.A.

(57) ABSTRACT

Methods and systems for determining augmentability information associated with an image frame captured by a digital imaging part of a user device. The determined augmentability score may then be used in the generation of feedback to the user. For example, a graphical user interface may be generated and rendered having a substantially continuous visual output corresponding to the augmentability information.

14 Claims, 10 Drawing Sheets

(56) References Cited

U.S. PATENT DOCUMENTS

2011/0013039 A1 1/2011 Aisaka
2011/0279453 A1* 11/2011 Murphy .................. G06T 13/00
345/420

OTHER PUBLICATIONS

Stephan Gammeter et al: "Server-side object recognition and client-side object tracking for mobile augmented reality", Computer Vision and Pattern Recognition Workshops (CVPRW), 2010 IEEE Computer Society Conference, Jun. 13, 2010, pp. 1-8.
International Search Report and Written Opinion from corresponding foreign application PCT/EP2011/067138, filed Sep. 30, 2011.
P. Marziliano, F. Dufaux, S. Winkler and T. Ebrahimi, A no-reference perceptual blur metric, International Conference on Image Processing, 2002.
R. Liu, Z. Li and J. Jia, Image Partial Blur Detection and Classication, IEEE Conference on Computer Vision and Pattern Recognition, 2008.

* cited by examiner

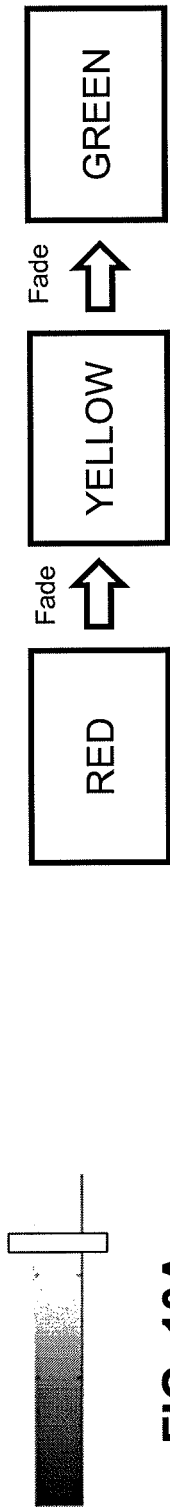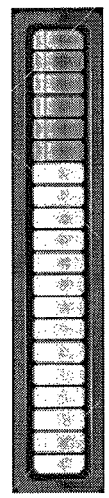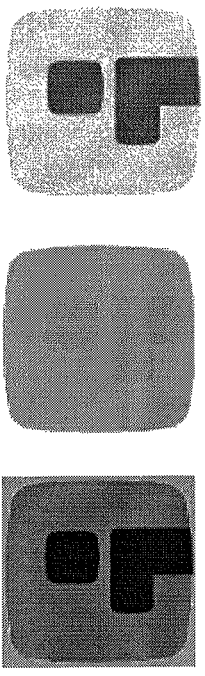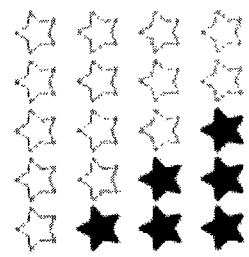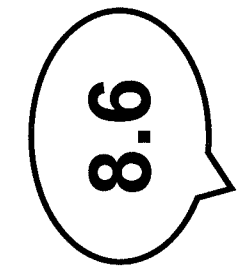
FIG. 10A
FIG. 10B
FIG. 10C
FIG. 10D
FIG. 10E
FIG. 10F
FIG. 10G

FEEDBACK TO USER FOR INDICATING AUGMENTABILITY OF AN IMAGE

CROSS-REFERENCE TO RELATED APPLICATION

This application is a Section 371 National Stage Application of International Application PCT/EP2011/067138 filed Sep. 30, 2011 and published as WO 2013/044983 A1 in English.

BACKGROUND

The discussion below is merely provided for general background information and is not intended to be used as an aid in determining the scope of the claimed subject matter.

The disclosure generally relates to methods and systems for enabling the generation of feedback to a user in augmented reality-based systems.

User devices equipped with an augmented reality capabilities are configured to provide a display of an augmented reality view of the surroundings. An augmented reality (AR) view is a display of a physical, real-world environment whose objects are augmented by computer-generated augmented reality content. Said display is provided to the user via the display output part of a user device. In the case of using visual graphics as augmented reality content, the computer-generated augmented reality content is superimposed and combined with a camera feed of the physical, real-world environment as captured by a digital imaging part of a user device.

In a vision-based augmented reality system, a target object is recognized (using vision-based object recognition). The augmented reality content associated with the target object is then retrieved and rendered to appear in perspective with the target object in AR view. The augmentations may be generated and rendered on the basis of an estimated three-dimensional pose of the target object. The estimated three-dimensional pose may be a result from a vision-based process performed on the basis of image frames captured by the digital imaging part of the user device. Said vision-based process may involve at least one of: object recognition and tracking.

Both object recognition and tracking depend on the quality of a reference image of the target object. The quality (also referred to as augmentability or suitability herein) may depend on a number of characteristics about the reference image or other relevant factors. However, those characteristics or relevant factors cannot be easily perceived by a human user. Thus, a user is not capable of or has difficulties judging whether an image frame is suitable enough for use as a reference image.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Hereinafter, embodiments of the invention aiming to alleviate the problem described above will be described in further detail. It should be appreciated, however, that these embodiments may not be construed as limiting the scope of protection for the present invention. For instance, combinations of any of the embodiments and limitations are envisioned by the disclosure.

The disclosure relates to methods and systems for determining the augmentability of an image frame as captured by a digital imaging part of a user device. The image frame may come from a buffer of image frames (e.g., captured at 20-30 frames/second), or the image frame may come from a still capture of the scene (e.g., taken by a user by pressing a button to capture a photo). In some embodiments, the determination may also be on the basis of other data from the user device. Based on the determined augmentability, some form of feedback may be generated and provided to the user such that the user may be alerted of a problem with the image frame. The user can then try to improve the augmentability of the image frame.

Augmentability feedback may be provided in "live mode" as a user is scanning the surroundings in camera view (display part of the user device displays the image data feed from the digital imaging part of the user device). In "live mode", the augmentability is determined and provided as feedback to the user in substantially real time on the basis of image frames from the image data feed. As such, the user is alerted substantially in real time as soon as an augmentable target object appears in the augmented reality view or is detected in the image frame. Augmentability feedback may be alternatively or additionally provided in "still mode" after a user has indicated the intent to use a specific image frame as a reference image for a target object. For example, once a user has tapped a touch-sensitive display screen to indicate his/her intent to capture an image and use that image as the reference image, the captured image frame is processed to determine its augmentability information, and feedback is generated and provided to the user based on said augmentability information. Note that there may be a delay between the user indicating his/her intent to capture the image (as seen through the display output part) and the digital imaging part actually capturing and providing an image frame for processing. If the user moves the device during this delay, the resulting image frame and its augmentability may have been affected during this time. Providing a mechanism to assess the image frame (also) in still mode provides a check for the user to ensure the resulting image frame is (also) suitable as a reference image frame.

In either mode, certain characteristics of an image frame and/or the user device are assumed to affect the augmentability of an image. Those characteristics may be measured and analyzed to infer or determine how well the image frame would work for object recognition and/or tracking. Data, information and/or a score may be used to represent the quality of the image frame.

The augmentability score/information may be calculated based on at least one of the following data/measurements that are indicative of the characteristics that affect augmentability: amount of motion of the device (and optionally data from camera parameters), level of exposure of the image frame, number of distinctive details (features) in the surface/object captured in the image frame and amount of blur. Different sets of measurement may be used depending on whether "live mode" or "still mode" is in use. These data/measurements may be collected or derived from an image frame captured by a digital imaging part of the user device and/or data collected from other parts of the user device.

In one exemplary embodiment, a method for providing augmentability feedback to a user of a device is disclosed.

The device comprises a client, an image processor, a digital imaging part, a memory storage, a motion sensor and an output part. Said feedback is indicative of quality of features associated with a target object in an image frame captured by the digital imaging part. Said features are extractable from the image frame in a system for object recognition and/or tracking (e.g., server remote from the client or a system locally on the device, communicably connected to the client over a bus or a network). Tracking may be related to, e.g., vision-based position, orientation and/or pose estimation. The image frame is retrieved from the memory storage. Blurring data is retrieved (or estimated) from at least one of: the motion sensor, camera parameter(s) from the digital imaging part, or the image frame. In the image processor, image information associated with the image frame is determined on the basis of the retrieved image frame, said image information indicative of the quality of the features associated with the target object. Blurring information associated with the user device and/or the target object is determined on the basis on the blurring data. Augmentability feedback for the user is generated on the basis of the image information and the blurring information, said augmentability feedback producible via an output part of the user device. The augmentability feedback provides information to the user with regards to the suitability of the image frame for use as a reference image in the object recognition and/or tracking system.

In some embodiments, said blurring information is determined on the basis of blurring data from the retrieved image frame, said blurring information indicative of the amount of defocus and/or motion blur present in the image frame. In some embodiments, said blurring information is determined, additionally or alternatively, on the basis of blurring data from the motion sensor and/or camera parameter(s) from the digital imaging part. For instance, blurring data may include: data from accelerometer, data from a gyroscope, shutter speed, ISO sensitivity, exposure time, etc.

The measurements and assessment are preferably able to provide a relatively and sufficiently good assessment on the quality of the reference image. Preferably, the measurements and assessment can be performed without requiring the computational cost of extracting and assessing the actual high quality features being used by an object recognition and tracking system. Effectively, the (coarse) measurements and assessments performed on an augmented reality client achieve several technical effects. First, the (local) processes on an augmented reality client for determining augmentability enables the AR service provisioning system to prevent bad reference images from being submitted to a (remote) system for further processing, thereby improving the quality of reference images as well as the resulting features extracted from those reference images used for object recognition and tracking (i.e., vision-based three-dimensional pose estimation). Second, the (local) processes on the augmented reality client enables coarse(r) measurements being performed before more computationally expensive feature extraction processes are needed at the (remote) system. Third, the (local) processes on the AR client, being able to provide quicker and sufficiently accurate feedback to the user, enables more efficient submission of (suitable) reference images by alleviating at least some of the need to wait for images to be, e.g., transmitted over the network and processed at the server only to find out that the image is not suitable for augmentations.

The disclosed embodiments will be further illustrated with reference to the attached drawings, which schematically show exemplary embodiments. It will be understood that the invention is not in any way restricted to these embodiments.

BRIEF DESCRIPTION OF THE DRAWINGS

Aspects of the invention will be explained in greater detail by reference to exemplary embodiments shown in the drawings, in which:

FIGS. 10A-G show illustrative graphical user interface elements generated on the basis of the augmentability of an image frame respectively, according to one embodiment of the present disclosure.

DETAILED DESCRIPTION OF THE ILLUSTRATIVE EMBODIMENTS

Augmented reality systems enable the generation and rendering of virtual content on top of a live camera feed (augmented reality view). The virtual content is generally displayed in perspective with a particular target object seen through the live camera feed. In other words, the virtual content and the target object appear to have substantially the same three-dimensional pose (position and orientation). However, before the content is displayed on screen, an augmented reality system first uses object recognition to identify the object that is seen through the camera feed. Once the identity of the target object is determined, a tracker is used to estimate the three-dimensional pose information of the target object. In object recognition and tracking, a reference image of the target object is used. Object recognition systems generate and use a fingerprint of the reference image to determine whether the tracked object is in an image frame or not. Tracking uses tracking features from the reference image to estimate the pose information of the tracked object in the image frame. Accordingly, the present disclosure presents solutions for determining the augmentability of an image frame, to ensure that a suitable image frame is used in such an augmented reality service provisioning system.

Depending on the image characteristics, some image frames and/or camera feeds are better than others for purposes of object recognition and tracking. For instance, an image of a blank white wall is not distinct enough to be recognized by the object recognition system and lacks sufficient features to enable tracking. In general, the augmentability or quality of an image frame of a target object or the target object itself may vary. However, it is difficult for humans to visually evaluate the quality or quantity of the features in an image by just looking at an image. Thus, there is a need to provide an evaluation of the augmentability of an image to aid the user in making a good quality reference image. Note that the disclosure concerns less with the perceived visual quality of an image, which is much more subjective and can be easily evaluated by a person by just looking at the display of the camera. Rather, the disclosure concerns more with the evaluation of the features in an image, such that the image's suitability for use a reference image frame in an object recognition and/or tracking system may be assessed.

Figure 1:
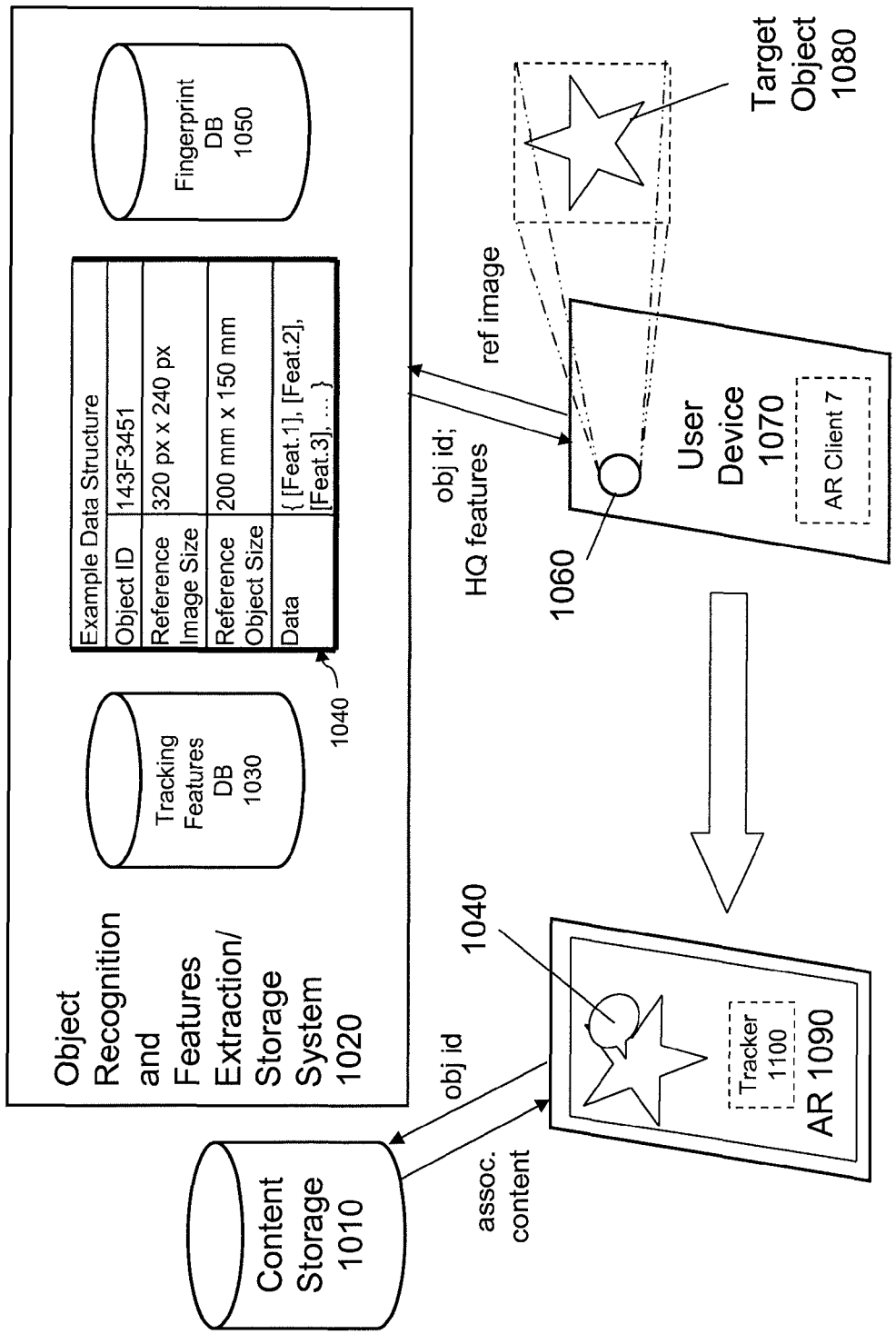
FIG. 1 shows an illustrative augmented reality service provisioning system.

FIG. 1 shows an illustrative augmented reality service provisioning system. In this illustrative system, object recognition and tracking is used to provide augmented reality content through user device 1070. The system comprises user device 1070, object recognition and feature extraction/storage system 1020 (which includes tracking features database 1030 and fingerprint database 1050 and content storage 1010). In "scanning mode" (or referred to as "live mode"), the display output part of user device 1070 displays a live camera feed of the surroundings as captured by digital imaging part 1060. User device 1070 points to a scene in the surroundings. The scene includes target object 1080 (e.g., a star shaped object). The "scanning mode" may be provided by augmented reality client 7 running on user device 1070.

At this point, augmented reality client 7 may perform some processing on an image frame captured by user device 1070 as well as data from other parts of user device 1070. The processing may directly and/or indirectly measure the quality of features in the captured image frame. The measurements may then be used to calculate augmentability information. The augmentability information and/or the measures may be used as inputs to generate feedback that is producible to the user through an output part of user device 1070.

If the measurements and/or augmentability information meet a certain suitability criteria (e.g., thresholds or rule-based criteria for determining whether the image frame is good enough), the image frame (e.g., "ref image" in FIG. 1) may then transmitted to another system (e.g., object recognition and feature extraction/storage system 1020). Generally, system 1020 performs high quality feature extraction to generate a fingerprint for the reference image (for object recognition purposes). During an object recognition process, a candidate image of interest is provided to system 1020 and a search is performed to find the best match between features of the candidate image against the database of fingerprints (stored in fingerprint database 1050). Furthermore, system 1020 performs high quality feature extraction to produce tracking resources that would enable a tracker on augmented reality client 7 to perform three-dimensional pose estimation. Exemplary data structure for storing fingerprints and tracking features is shown in table 1040. In return, an object identifier and high quality tracking features (as "obj id; HQ features") is returned to user device 1070.

On the basis of the object identifier, user device 1070 may communicate with content storage 1010 to retrieve content that is associated with target object 1080, such that the content (e.g., graphic 1040) can be displayed in augmented reality view 1090. Tracker 1100 of augmented reality client 7 may use the high quality tracking features to estimate the three-dimensional pose of target object 1080. The three-dimensional pose estimation enables the generation of graphic 1040, such that content can be displayed in perspective with target object 1080 as seen through augmented reality view 1090.

One of the goals of the disclosed embodiments is to generate and provide feedback to the user to let him/her know whether the reference image is good enough before system 1020 has to perform the computationally expensive and time consuming feature extraction processes. The user may be an end user of the user device, or a content provider or developer responsible for the generation of reference images. One other reason for providing the feedback to the user is to educate/train him/her about the technology. Users not acquainted with the technology (e.g., object recognition or tracking) are rarely able to judge whether the image is suitable for use as a reference image.

Figure 2:
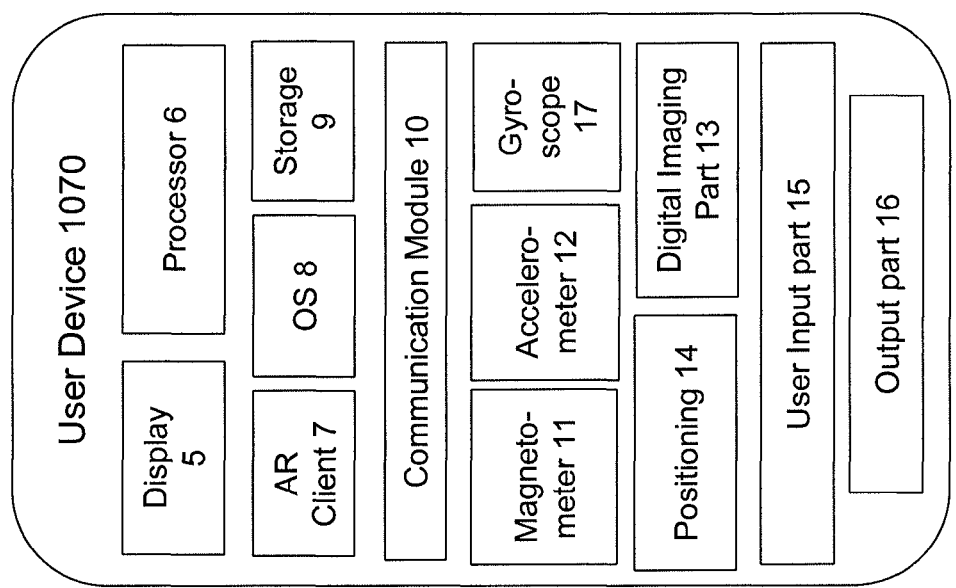
FIG. 2 shows an illustrative user device, according to one embodiment of the present disclosure.

FIG. 2 shows an illustrative user device, according to one embodiment of the present disclosure. User device 1070 comprises a plurality of components, modules and/or parts that may be communicably connected together by a communication bus.

Display output part 5 preferably includes a digital output display, such as a color light emitting display communicably connected with augmented reality client 7. For instance, graphical user interface elements and image frames are rendered for display via display output part 5. In some embodiments, display output part 5 is a capacitive touch-sensitive display screen. For example, display 5 may be combined with user input part 15 to provide a touch-sensitive display. Naturally, other types of touch screens may also be used. Display 5 may also be projection based (e.g., projection glasses). Display 5 may be a suitable output device for presentation of information in visual form. In some embodiments, a display for a spatial augmented reality system may be a projection of visual information onto real world objects. In some other embodiments, a display for a head-mounted augmented reality system may be optically projected into the eyes of a user through a virtual retinal display.

User device 1070 has a processor enabling the computations for supporting the methods and systems described herein. Processor 6 may be a semiconductor device configured to perform computations for carrying the functions of user device 1070. In some embodiments, processor 6 includes a graphics processing unit specialized for rendering and generating computer-generated graphics. Preferably, processor 6 is configured to communicate, e.g., via a communication bus, with other components of user device 1070. In this manner, the processor may execute processes using data from other components of user device 1070.

An implementation of AR client 7 may be at least partially implemented as a software package installed or configured to run on user device 1070, preferably configured to perform the methods described herein. The AR client may also be at least partially implemented in dedicated and specialized hardware on user device 1070. The implementation of AR client 7 may be a computer program product, stored in non-transitory storage medium, when executed on processor 6, is configured to provide an augmented reality experience to the user. In certain embodiments, AR client 7 provides a camera view (or "scanning mode" or "augmented reality view") where a user may view the real world through display output part 5, whereby processor 6 (in conjunction with AR client 7) combines an optically acquired image from digital imaging part 13 and any suitable computer generated graphics from processor 6 to generate the augmented reality camera view. In some embodiments, AR client 7 includes an image processor for processing pixel data from image frames captured by digital imaging part 13. In yet some embodiments, AR client 7 includes feedback generators, such as graphical user interface or audio output generators.

Operating System 8 enables AR client 7 to communicate with other parts of user device 1070 such as access to memory in storage 9). Operating system 8 may be configured to manage processes running on processor 6, as well as facilitate various data coming to and from various components of user device 1070. User device may use communication module 10 to communicate, over a network with system 1020, content storage 1010, or any necessary content providers, devices or systems for providing augmented reality content. For instance, communication module 10 enables AR client 7 to communicate with entities remote from user device 1070. Storage 9 may be any physical, non-transitory storage medium configured to store data for user device 1070 (data includes image frames acquired by digital imaging part 5 and data from sensors). For example, storage 9 may store program code and/or values that are accessible by operating system 8 running on processor 6. In another instance, images captured by digital imaging component 13 may be stored in storage 9 as an image frame buffer. Storage 9 is preferably computer data storage referring to components for recording digital data, such as semiconductor storage random-access memory, hard disk drives, optical disc drives, etc.

User device 1070 may include at least one of the following sensors: magnetometer 11, accelerometer 12, positioning 14, and gyroscope 17. Sensors regarding the physical state of user device 1070 and the environment surrounding user device 1070. Magnetometer 11 (also referred to as magneto-resistive compass or electronic/digital compass) may be an electronic device configured to measure the magnetic field of the Earth, such that a compass reading may be determined. In some embodiments, user device 1070 may include (e.g., 3-axis) gyroscope 7, to measure tilt in addition to direction heading or rate of change thereof. Furthermore, orientation and/or rotational rate data may be measured by gyroscope 17. User device 1070 may include accelerometer 12 to enable an estimate movement or displacement of user device 1070. As such, an accelerometer may be used to measure the direction and acceleration of user device 1070 (i.e., direction and rate of change of displacement). For instance, accelerometer 12 may assist in measuring the distance traveled by user device 1070. User device 1070 may include positioning device 14 configured to estimate the physical position of user device 1070 within a reference system. For instance, positioning device 14 may be part of a global positioning system, configured to provide an estimate of the longitude and latitude reading of user device 1070. Other sensors, not shown in FIG. 2, may include proximity and light sensors. Suitable proximity sensors may estimate the distance of an object near the user device. Light sensors may estimate the amount of light in the environment of the device.

Digital imaging part 13 captures images of the real world and provides a live image data stream, for example in an image frame buffer in storage 9 to which AR client 7 has access. AR client 7 running on user device 1070 is configured to generate an augmented reality view (or camera view) by displaying a graphical overlay in display part 5 over the live image data stream feed from digital imaging part 13. The graphical overlay is generated from the augmented reality content. The generation of graphical overlay may be performed by a graphics engine in AR client 7.

A user may utilize user input part 15 to interact with graphical user interfaces provided by user device 1070. User input part 15 may include a keypad, touch screen, microphone, mouse, keyboard, tactile glove, motion sensor or motion sensitive camera, light-sensitive device, camera, depth or range cameras, or any suitable user input devices. Output part 16 may include other output such as audio output, haptic output (e.g., vibration, heat), or any other suitable sensory output.

The measurements made on the image frame are related to the quality of the result(s) of one or more feature extraction processes present at a server remote from user device 1070 (note that the quality of feature extraction process is a distinct concept from visual/aesthetic quality of images). For instance, the server is system 1020 communicably connected to user device 1070 over a network, configured to process reference image frames to generate a fingerprint for object recognition and/or generate features suitable for tracking (i.e., vision-based three-dimensional pose estimation). These measurements made on the image frame are associated and/or correlated to the quality or quantity of features extractable from the image frame by those processes. Accordingly, the measurements indicate the suitability (sometimes referred to as "augmentability") of a reference image because object recognition and tracking of objects rely on detection of distinctive features (e.g., sharp corners and/or lines) in the image frame.

For this reason, suitable images may have at least one of the characteristics: flat, visually textured surfaces with substantial amount of details, high contrast. On the other hand, the number of corners and/or lines is significantly reduced in curved and smooth shapes. In addition, the detection of distinctive corners and/or lines is greatly affected by the amount of light in the scene, glare from strong direct light, blur, and other characteristics that may reduce visibility or sharpness in the image. Moreover, repetitive patterns in an image may be unsuitable for tracking because repetitive patterns introduce difficulties in finding distinctive corners or lines in the image.

Examples of objects that are more suitable for object recognition and/or tracking include: magazines and newspapers (i.e., flat surfaces with high-contrast text and graphics), greeting cards, graffiti and street art, product packaging, posters, flyers, billboards, and photographs. Examples of objects that are less suitable for object recognition and/or tracking include: smooth and/or shiny surfaces such as the sky, plain walls, metal surfaces, glass, plants and landscapes, cans, bottles, and repetitive patterns such as checkerboards and brick walls.

A series of comparisons are made in FIGS. 3-6 to illustrate relationship between the measurements and the augmentability of an image frame. An illustrative scoring system was applied to the images, with scores between 0 to 1. A score of 0 being the least suitable and a score of 1 being the most suitable. The score is exemplarily calculated based on a particular type of measurement done on the image frame. Said score (for illustration only) is generated as a graphical user interface element and is rendered for display on top of the image frame for illustration.

Figure 3:
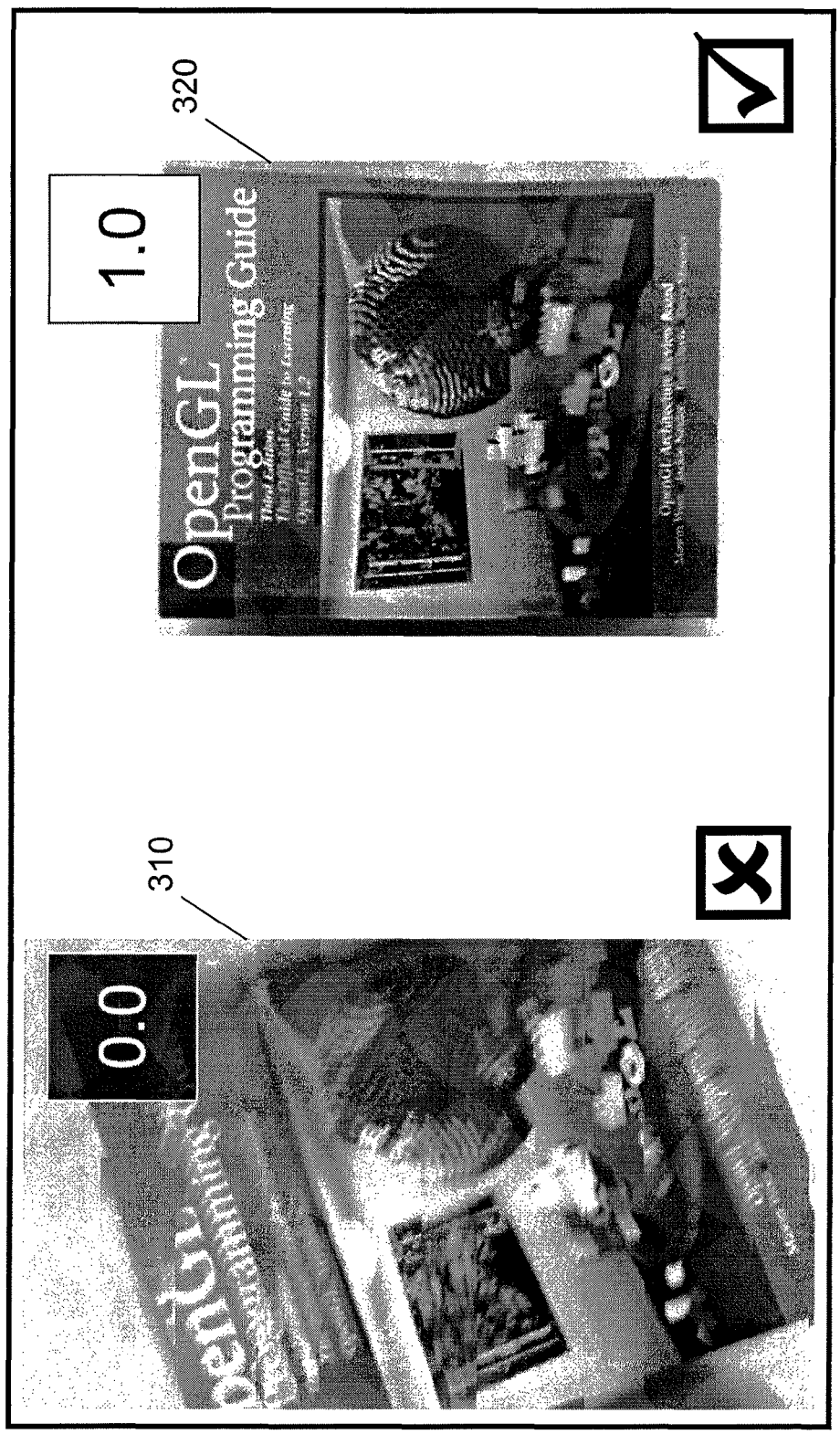
FIG. 3 shows an illustrative comparison of two images whose augmentabilities are affected by the amount of motion of a user device, according to one embodiment of the present disclosure.

FIG. 3 shows an illustrative comparison of two images whose augmentabilities are affected by the amount of motion of a user device, according to one embodiment of the present disclosure. One of the possible measurements usable for determining augmentability of the image is motion of the user device. Moving any camera with relatively fast or abrupt movements is likely to cause blurring in the resulting camera image. Consequently, an image frame of a target object captured when the camera is moving will not have sharp edges and corners. Accordingly, the chance of that image frame being suitable for object recognition and tracking is slimmer. Motion-related sensors, such as an accelerometer and/or or gyroscope of the user device may be used to provide a measurement related to the amount of motion of the user device. Seen in screen shot 310, an image frame is captured at substantially the same time where a relatively high amount of motion is detected. The image frame shows significant degradation of the image due to blurring and other related artifacts. As a result, the image is not clear and is not a suitable image where distinct features can be extracted. As seen in screen shot 310, a different image frame is captured at substantially the same time where a relatively low amount of motion is detected. The image frame shows a substantially clear and still image of the target object. As a result, the image of on right is likely to be more suitable for use as a reference image and feature extraction.

Figure 4:
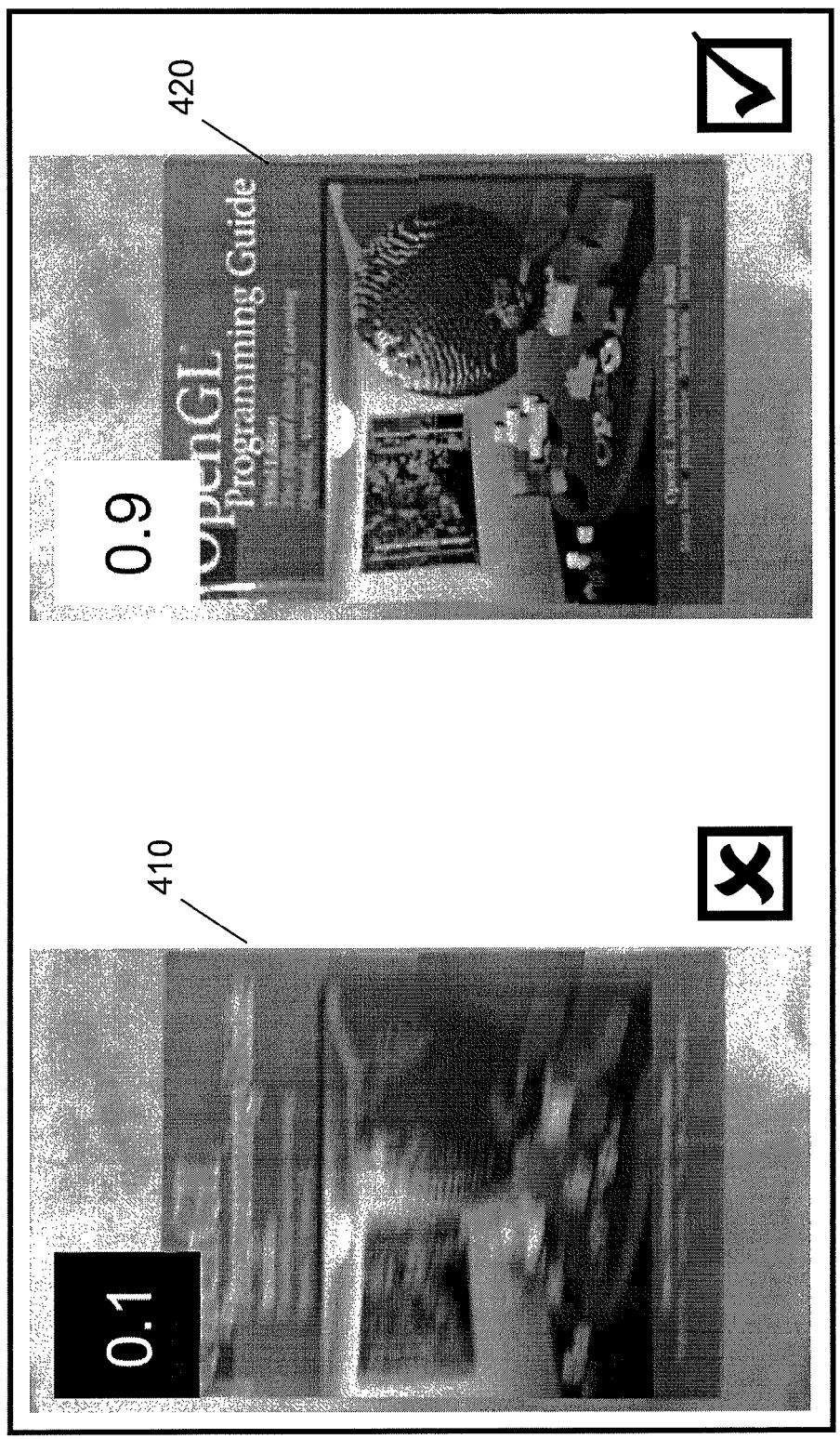
FIG. 4 shows an illustrative comparison of two images whose augmentabilities are affected by the amount of blurring, according to one embodiment of the present disclosure.

FIG. 4 shows an illustrative comparison of two images whose augmentabilities are affected by the amount of blurring, according to one embodiment of the present disclosure. Another of the possible measurements usable for determining augmentability of the image is blurring of the image. Digital image processing techniques for detecting the extent of blurring may be used to provide a measurement related to the amount of blur present in the image frame. The existence of a high amount of blurring present in an image is likely an indication that the image does not have a lot of sharp features such as edges and lines. As a result, the chance of a highly blurred image frame being suitable for object recognition and tracking is slimmer. On the left, screen shot 410 shows an image capturing the target object on a table top shows blurring of the object, perhaps due to the motion of the target object. The motion blur can be detected and the amount thereof may be measured using a blurring detection algorithm. Due to the motion blur present in the image, the image is not clear and is not a suitable image where distinct features can be extracted. On the right, screen shot 420 shows an image captured wherein the target object was not moving, shows a substantially clear and still image of the target object. As a result, the image is more suitable for use as a reference image and feature extraction.

Comparing the images degraded by blurring in FIG. 3 and FIG. 4, one skilled in the art may appreciate that the information measured by a motion sensor is distinguished from the information measured by a blurring detector. Information measured by a motion sensor may detect the motion of the user device. Information measured by a blurring detector may further detect blurring caused by, e.g., de-focus or motion of the target object.

The degradation caused by the motion of the user device (and the digital imaging part thereof) is likely to be present in the entire image frame. As the imaging sensors of the digital imaging part move together, the degradation would occur over all the imaging sensors during exposure causing the blurring effect over the entire image. As such, the left image frame seen in FIG. 3 (screen shot 310) associated a high amount of motion of the camera exhibits degradation in the entire image frame (both the target object and the table top). The degradation caused by the motion of the target object is likely to be present only in the area of the target object within the image frame. As such, the left image frame seen in FIG. 4 (screen shot 320) associated with a high amount of motion of the target object exhibits degradation only in the area of the target object (and not the table top). In this situation of FIG. 4, motion associated with the user device may be low (the device is holding still), thus the information based on the motion sensors may not detect the blurring exhibited in this left image. However, information based on a blurring detector using a digital image processing technique is able to detect blurring caused by the motion of the target object.

Note that the measurement of motion of the user device and the blurring of the image makes it possible to determine that an image is not suitable for augmentations even though enough features are detected. In some situations, features may not be very stable (e.g., features are detected in one video frame, but not in another or that the features are only recognizable under specific imaging conditions), making a feature count measurement deficient in detecting an augmentability problem with the image frame. These situations often occur due to the movement of the object or movement of the user device.

Figure 5:
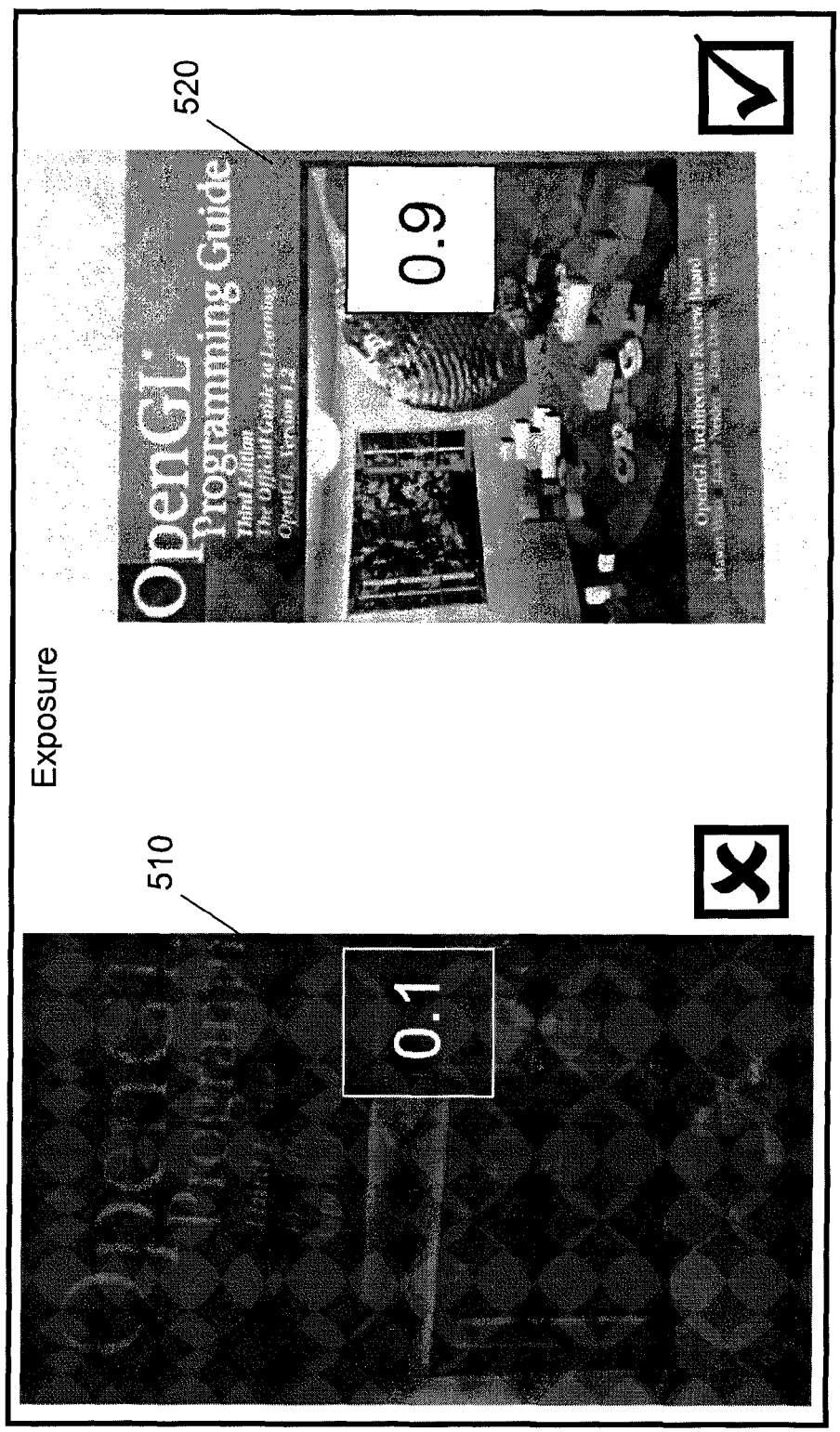
FIG. 5 shows an illustrative comparison of two images whose augmentabilities are affected by the level of exposure, according to one embodiment of the present disclosure.

FIG. 5 shows an illustrative comparison of two images whose augmentabilities are affected by the level of exposure, according to one embodiment of the present disclosure. Another of the possible measurements usable for determining augmentability of the image is level of exposure of the image frame. Digital image processing techniques for determining the level of exposure may be used to provide a measurement correlated with the quality or quantity of features extractable from the image frame. Over exposed or under exposed images tend to lose details of the image frame, thus affecting the quality or quantity of distinct features present in the image. An image frame may be described as overexposed when it has a loss of highlight detail, that is, when important bright parts of an image are "washed out" or effectively all white. An image frame may be described as underexposed when it has a loss of shadow detail, that is, when important dark areas are "muddy" or indistinguishable from black. One way of measuring exposure is by analyzing the luminance level of pixels sampled from the image frame. For instance, a histogram may be used for the analysis of luminance level distribution. Over or under exposure of an image is likely an indication that the image does not have a lot of sharp features such as edges and lines (details are washed out in the whites or in the darks). As a result, the chance of an under exposed or over exposed image being suitable for object recognition and tracking is slimmer. As seen in the image on the left in FIG. 5 (screen shot 510), an image frame capturing the target object is degraded due to under exposure, where details of the target object are washed out in the dark. The extent of under (or over) exposure may be detected using an exposure calculation algorithm. The image is not clear and is not a suitable image where distinct features can be extracted. As seen in the image on the right in FIG. 5 (screen shot 520), an image that is not under exposed or over exposed shows a substantially clear image of the target object where details are shown adequately without excessive washing. As a result, the image is more suitable for use as a reference image for feature extraction.

Figure 6:
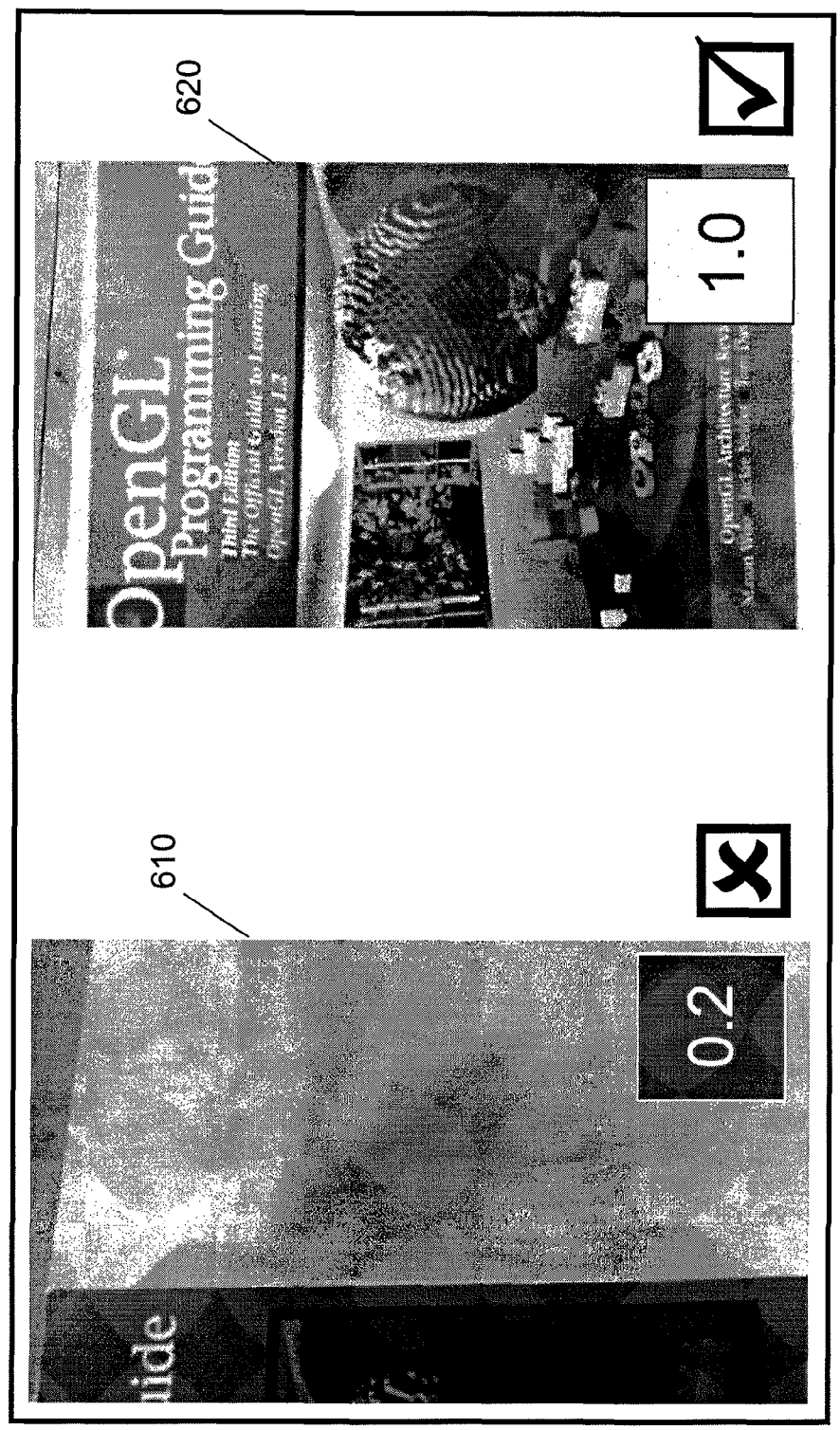
FIG. 6 shows an illustrative comparison of two images whose augmentabilities are affected by the number of distinctive details, according to one embodiment of the present disclosure.

FIG. 6 shows an illustrative comparison of two images whose augmentabilities are affected by the number of distinctive details, according to one embodiment of the present disclosure. Distinctive details (also referred to as features) may be represented as descriptors of an image frame. Specifically, a descriptor stores a compact information string describing an image property. One of the possible measurements usable for determining augmentability of the image is number of distinctive features. Perhaps the most accurate measurement of the quality or quantity of features present in the image, a feature count is directly correlated to how well the image frame would work as a reference image frame for purposes of object recognition and tracking. Digital image processing techniques for feature detection may be used to detect features (e.g., from a downsampled image) and subsequently count those detected features. A low number of features (e.g., edges and/or lines) in an image is likely a direct indication that the image does not have enough distinctive features suitable for object recognition and/or tracking. As a result, the chance of an image frame with relatively low number of features being suitable for object recognition and tracking is slimmer. On the left, screen shot 610 shows an image capturing the target object on a table top where the target object is mostly out of view and the table top dominates the image frame. Because the table top is of fairly uniform and smooth texture, the image frame does not exhibit many detectable/extractable features. Accordingly, the image is not a suitable image where distinct features can be extracted. On the right, screen shot 620 shows an image captured showing a clear view of the target object. As a result, many features may be detected/extracted from this image frame. Accordingly, this image frame is more suitable for use as a reference image and feature extraction.

Other image characteristics that may be considered for augmentability include: image contrast, frame difference, all the above described properties measured per region rather than in the whole image, etc. Augmentability may also consider higher-level features such as texture descriptors, color descriptors, shape descriptors, image segmentation into regions, or any other data derived from other image and video processing techniques.

Figure 7:
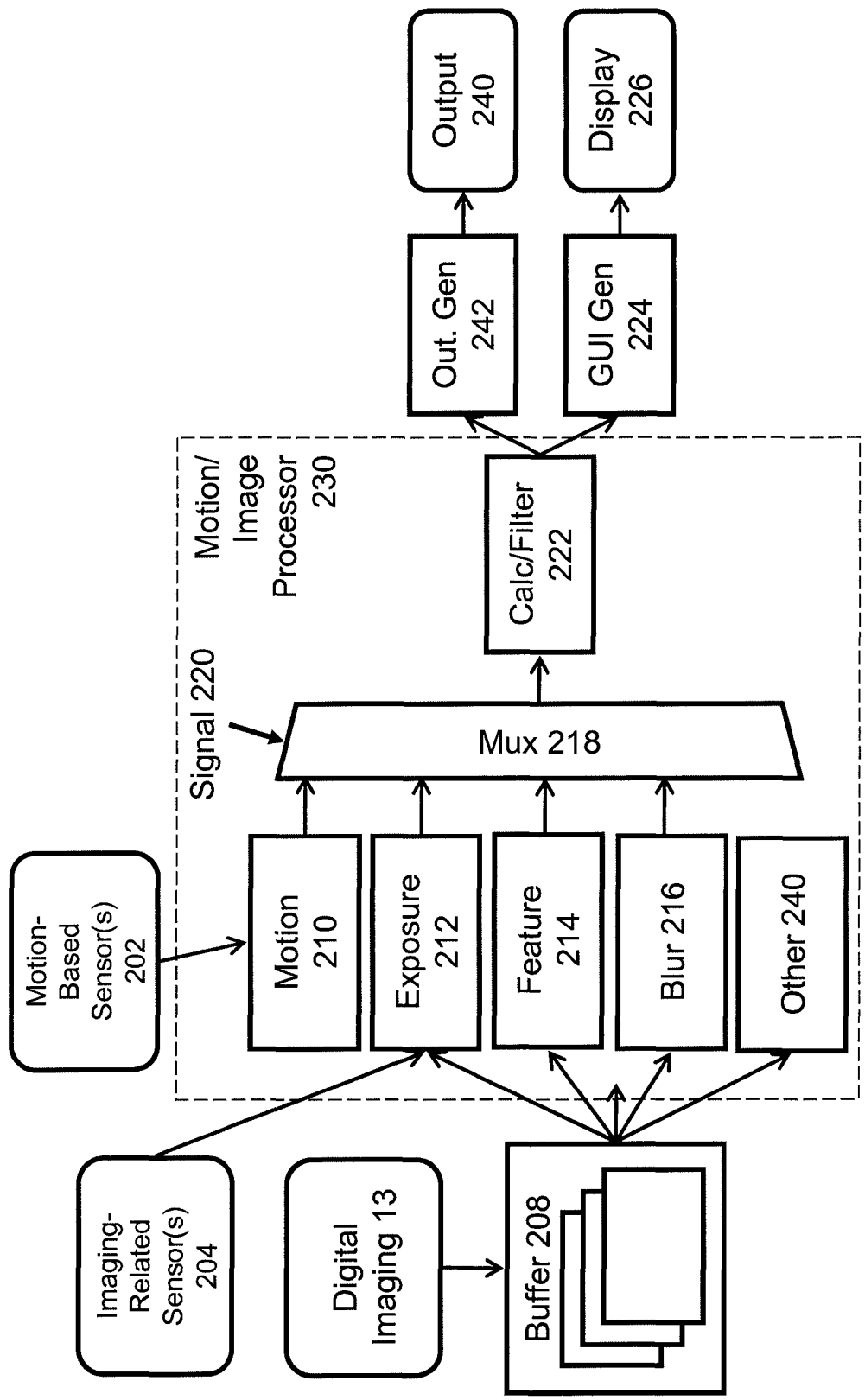
FIG. 7 shows an illustrative system for determining augmentability and generating/rendering a graphical user interface element on the basis of augmentability, according to one embodiment of the present disclosure.

FIG. 7 shows an illustrative system for determining augmentability and generating/rendering a graphical user interface element on the basis of augmentability, according to one embodiment of the present disclosure. Motion/image processor 230 is configured to process sensor and image frame data as inputs such that measurements can be made from the inputs to generate an output that indicates the augmentability of a particular image frame. That output may then be subsequently used to generate feedback for a user.

Specifically, image processor comprises a plurality of measurement modules. The modules may include at least one of: motion 210, exposure 212, feature 214, blur 216, other 240. Depending on the state of the image processor (e.g., "still mode", "live mode", etc.), control signal 220 may be inputted into multiplexer 218 to select at least two of the measurements to be used in calculator/filter 222. As such, the optimal set of measurements can be taken and processed depending on the current situation. For instance, the optimal set of measurements may be selected based on the available computing resources on the user device. In one embodiment while in "live mode" (where computing resources may be relatively limited), control signal 220 enables the selection of measurements (using mux 218) coming from motion 210, exposure 212 and feature 214. In another embodiment while in "still mode" (where computing resources may be relatively less limited), control signal 220 enables the selection measurements (using mux 218) to include measurements coming from exposure 212, features 214, blur 216, and possibly other 240. As one skilled in the art would understand different combinations of suitable measurements may be used to determine the augmentability of the image frame, depending on the context of usage and the requirements for performance and computing times.

Motion module 210 uses data from motion-based sensor(s) 202 to produce a measurement of motion associated with the user device. Examples of motion-based sensor(s) include accelerometer 12 and gyroscope 17. In some embodiments, the raw data is used as an input through mux 218 at calculation/filter 222 module. In some other embodiments, a derivation of the raw data is used in place of or in addition to the raw data. For instance, the derivation of the raw data (such as a numerical score) may be calculated using an algorithm, rule-based criteria, etc. by taking the raw data as input and outputting the derivation of the raw data. The derivation of the raw data and/or the raw data itself, also referred to as motion information, is preferably a representation or indication of the augmentability of an image frame preferably captured about the same time when the raw motion data is collected by motion-based sensor(s) 202.

Exposure module 212, feature module 214, blur module 216 and other module 240 are preferably modules configured with digital image processing techniques for producing image-based measurements. Image-based measurements are taken from at least one image frame retrieved from buffer 208 (in non-transitory computer readable medium) and captured by digital imaging part 13. Measurements are taken from an image frame by processing data from pixels in the image frame and performing an algorithm that derives image information from the pixel data. In some embodiments, imaging-related sensor(s) 204 such as light and proximity sensors may be used as alternative or additional input to these image-based measurement modules.

In the exemplary embodiment shown in FIG. 7, exposure module 212 measures luminance values of pixels sampled from an image frame from buffer 208. Feature module 214 measures the number of features present in an image frame. In some embodiments, feature module 214 measures from a downsampled version of the image frame if computational efficiency is desired. Blur module 216 measures the extent of blurring present or detects high amount of blurring in a downsampled version of the image frame. Other module 240 may be any suitable image-based measurement module configured to output image information that indicates the suitability of the image frame for being used as a reference image for object recognition and/or tracking purposes. On the basis of the pixel data, at least one measurement is produced and provided as output from at least one of these image-based modules for further processing by calc/filter 222.

Once appropriate measurements are made and passed on to calculation/filter 222 module (enabled by signal 220 and mux 218), calculation/filter 222 module processes the measurements which represents the suitability of the image frame as a reference image. In some embodiments, calculation/filter 222 takes the measurements as inputs to an algorithm (e.g., mathematical formula, rule-based decision tree, etc.) to generate at least one augmentability score/information. In some embodiments, one single piece of augmentability information is used to represent all the measurements used in calculating that information. In certain embodiments, a plurality of pieces of augmentability information is used that separately represents the plurality of measurements.

The augmentability information indicates the suitability of the image frame as a reference image based on the plurality of measurements. The augmentability information may then be used as an input to generate feedback to the user. In some embodiments, the augmentability information is smoothed or filtered such that the feedback generated is substantially absent of sharp changes or annoying jitter in the feedback provided to the user.

The augmentability score/information is used as an input to at least one feedback generator. For example, a feedback generator may be output generator 242 configured to provide audio/haptic output. Depending on the type of output, the output feedback is produced via output part 240 of the user device (e.g., vibrator, speaker, output part 16 of FIG. 2). In another instance, a feedback generator may be graphical user interface generator 224 (implemented in a graphics engine in some cases), configured to generate a graphical overlay based on the augmentability score/information. The graphical overlay is then rendered for display via display 226 of user device (e.g., display part 5 16 of FIG. 2). In certain embodiments, the feedback is provided to an entity different from the user device (e.g., a data collection module, a content provider, etc.)

In some embodiments, the measurements from the different measuring modules and/or derivations of the measurements may be directed back to digital imaging part 13 to directly adjust imaging settings such as exposure time or sensitivity settings such that a better image frame may be captured.

Figure 8:
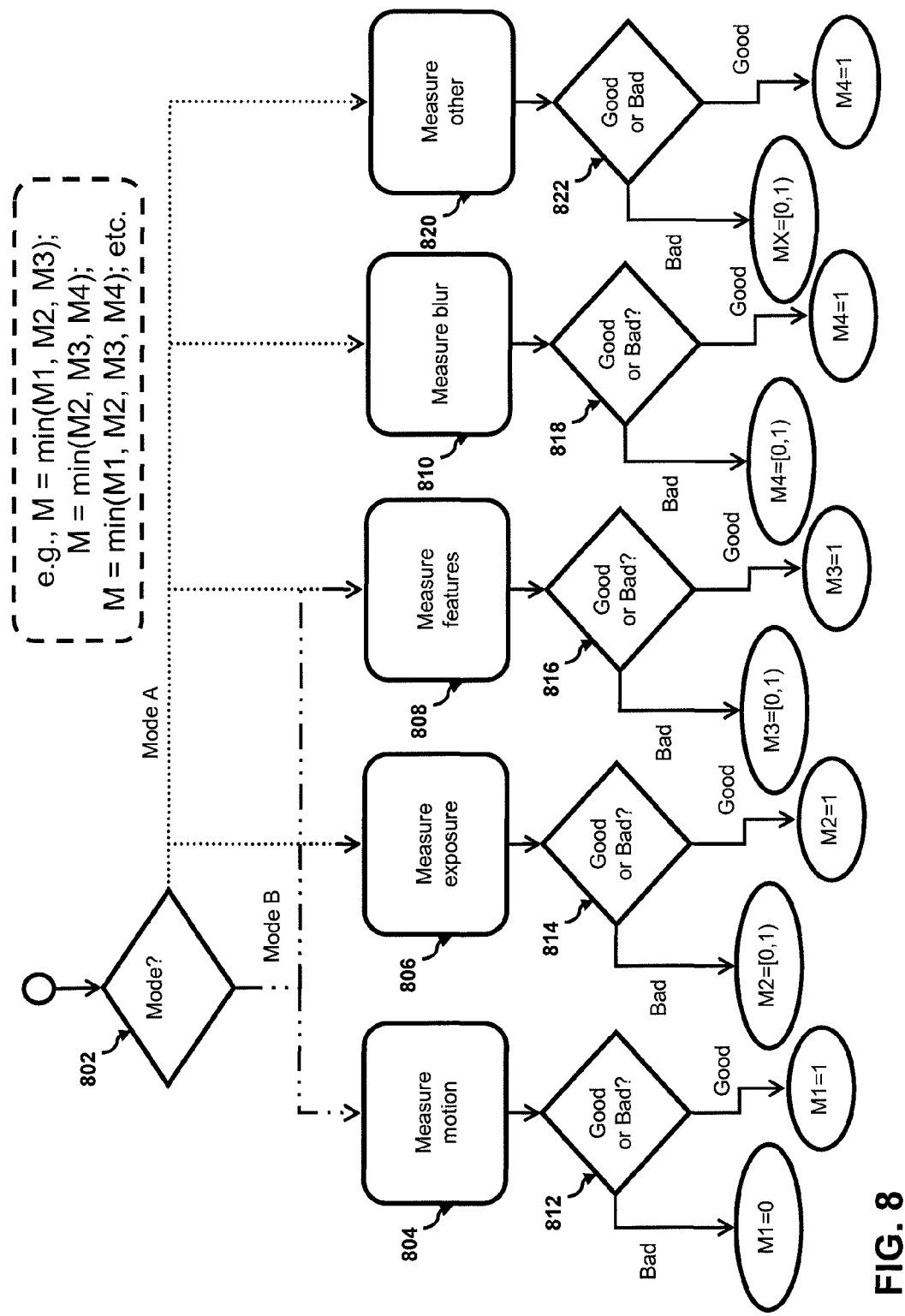
FIG. 8 shows an illustrative process for determining augmentability, according to one embodiment of the present disclosure.

FIG. 8 shows an illustrative process for determining augmentability, according to one embodiment of the present disclosure. Using the illustrative system shown in FIG. 7, the exemplary decision process in FIG. 8 further describes algorithms used for deriving a measurement from the raw data (motion sensor data and/or image data) and how those measurements are used to determine the suitability of the image frame as a reference image. The exemplary decision processes normalize each measurement (e.g., M1, M2, M3 and M4) to take on a value between 0 to 1 (substantially continuous range). A measurement value of "0" indicates that the image frame is the least suitable for use as a reference image on the basis of that measurement. A measurement value of "1" indicates that the image frame is the most suitable for use as a reference image on the basis of that measurement.

At decision point 802, if the implementation supports different modes of operation, the current mode of operation is determined such that the system can determine which measurements to make and consider. In the example as shown, there are two illustrative modes, Mode A and Mode B. If the system is Mode A, then the process proceeds to measure exposure 806, measure features 808, measure blur 810, and possibly measure other 820. If the system is in Mode B, then the process proceeds to measure motion 804, measure exposure 806 and measure features 808. As one skilled in the art would understand, different modes and different combinations of suitable measurements may be used depending on the implementation of the process.

To compute M1 (using motion module 210 of FIG. 7), motion data is collected/retrieved from motion-based sensor(s) (at step 804), such as accelerometer 12 and/or gyroscope 17. In one embodiment, the magnitude of an acceleration vector A (e.g., in meters/second$^2$) is determined using acceleration raw data from the accelerometer. Alternatively and/or additionally, the magnitude of a rotational rate vector G (e.g., in radian/second) is determined using orientation raw data from the gyroscope. The acceleration vector and rotation rate vector, alone or in combination, is a measurement that represents abrupt motions of the user device, and thus, indicates the likelihood of blurring being present in an image frame captured at substantially the same time as the moment when the acceleration and orientation raw data is collected. Illustration of blurring caused by the motion of the device is described in connection with FIG. 2.

Based on the data collected, a determination is made on M1 (e.g., motion score or motion information) at decision point 812. In one embodiment, M1 has a binary state, taking on a value of 0 or 1, with 0 indicating too much motion and 1 indicating no or little motion, based on fixed thresholds (thresh_A for A and thresh_G for G, e.g., stored in memory of user device). M1 can be calculated following this pseudo-code below. Empirical experimentation shows that thresh_A and thresh_G may be set at about 0.8 meter/second$^2$ and 0.6 radian/second$^2$, respectively.

```
If (A > thresh_A) or (G > thresh_G) Then
    M1 = 0  // when too much motion is detected
Else
    M1 = 1  // when little or no motion is detected
End if
```

Other implementations for calculating M1 is also envisioned. For instance, the condition in the example above may require both A and G to be above their respective thresholds. In another instance, then M1 may fall on a value between a substantially continuous range from 0 to 1 that represents a range of motion detected. In yet another instance, M1 may take on one of integer number of possible values (e.g., three possible values: 0, 0.5, and 1, determined using another set of thresholds). In one instance, the calculation of M1 may involve learning of thresholds of acceleration/motion in a period when the user device is relatively stable/stationary. In yet another instance, a threshold (function) dependent on the current shutter speed of the camera device may be used. For example, for shorter shutter speeds, the thresholds may be set higher (less motion blur likely to be present), while for longer shutter speeds the thresholds may be set lower (more motion blur likely to be present). One skilled in the art may envision that other camera parameter(s) may be used, such as ISO sensitivity.

To compute M2 (using exposure module 212 of FIG. 7), pixel data is collected/retrieved from an image data stream buffer in memory at step 806. In some situations, other information may be collected from image-based sensor(s) such as light sensors at this step. To increase computational efficiency, the image frame of interest is preferably down-sampled and the luminance channel data is collected from the sparsely sampled pixels.

Based on the luminance pixel data collected, a value for M2 is determined (e.g., exposure score, exposure information, image information) at decision point 814. Either at the data collection step of 806 or in the decision point 814, the pixel data is tabulated or accumulated in a histogram with a fixed number of bins (e.g., 16 bins, 32 bins, etc.). A histogram enables the process to examine a distribution of the luminance data. In one embodiment, the lowest ⅓ of bins are referred to as "dark" bins and the highest ⅓ of bins are referred to as "light" bins. Other splits of the highest/lowest bins may also be used (e.g., ¼, ⅖, 3/7, etc.). If the total number of values in "dark" bins pix_D exceeds a threshold thresh_E relatively to the total number of samples pix_T, the number is translated into a measurement M2_dark based on a linear function—see in pseudocode below.

```
If (pix_D/pix_T > thresh_E) Then
    // under-exposed, use linear function
    M2_dark = ((pix_D/pix_T)−1)*(1/(thresh_E−1))
```

```
    Else
        // OK exposure
        M2_dark = 1
    End if
```

Because thresh_E represents a ratio, thresh_E may take on possible values in the range of [0, 1]. The condition in the above pseudocode effectively measures the percentage of pixels in the (downsampled) image that belong to "dark" bins. If this percentage exceeds the chosen threshold thresh_E, then the output is based on the above linear function. This linear function assumes the value 1.0 for the case (pix_D/pix_T)=thresh_E, and the value 0.0 for the case (pix_D/pix_T)=1.

"Light" bins may be handled in a similar fashion, but using a different threshold parameter thresh_F (which may be chosen equal to or different from thresh_E). A measurement M2_light is then calculated. Based on M2_dark and M2_light, M2 is determined. In one embodiment, M2 is the minimum of M2_dark and M2_light (the worse value overrides M2). Empirical experimentation shows that thresh_E and thresh_F may be set at about 0.4 (i.e., 40% of all pixels) and 0.4, respectively.

Other implementations for calculating M2 are also envisioned. For instance, if a dedicated light sensor is available on the user device, the light detected (i.e., output) may be used as part of the condition to determine whether the light level is causing under exposure or over exposure, or to cross-check/overrule results of the image-based analysis. In another instance, a linear combination of M2_dark and M2_light may be used instead of using a minimum of the two. In yet another instance, one skilled in the art may use other mapping functions for mapping pix_D, pix_T to M2_dark, e.g., a nonlinear function, a look up table, etc.

To compute M3 (using feature module 214 of FIG. 7), pixel data is collected/retrieved from an image data stream buffer in memory at step 806. To increase computational efficiency, the image frame of interest is preferably downsampled so that feature detection can be performed in an efficient manner. Downsampling may be performed in two distinct ways, depending on the mode of operation. Note that downsampling may also be applicable in other measurements. In "live mode", image frames are typically of lower resolution (<0.5 megapixels) and in "still mode", image frames are typically of higher resolution (>2.0 megapixel). As such, amount of downsampling can be adjusted accordingly (more downsampling for a larger image, less downsampling for a smaller image).

In one embodiment where downsampling is performed on an image frame captured in "live mode", the image frame is reduced in size by simply averaging neighboring pixels, either as 2×2, 3×3 or 4×4 blocks. The sub-sampling factor may be determined by: subsampleFactor=ceil(longSide/320).

In one embodiment where downsampling is performed on an image frame captured in "still mode", to obtain an image of a certain size (e.g., for which the long size is 320 pixels), a decimation algorithm is applied to avoid aliasing effects caused by downsampling. Aliasing effects may introduce errors to feature detection/extraction to be performed later on (e.g., introduce features that did not exist in the original image). Example decimation algorithms may include lowpass filtering by convolution with a Gaussian kernel, or downsampling by a suitable factor using bilinear interpolation.

Once the image is downsampled, a corner and/or line detection algorithm can be applied to detect features present in the downsampled image. Example of line (or edge) detection algorithms may include: Canny, Canny-Deriche, Differential, Sobel, Prewitt, Roberts Cross, Interest point detection, Gaussian differential and gradient filters, etc. Example of corner detection algorithms may include: Harris operator, Shi and Tomasi, Level curve curvature, SUSAN, FAST, etc.

In one embodiment, the number of detected distinctive features (line and/or corner) N may be transformed into a feedback value M3 based on a threshold thresh_C, at decision point 816 based on the pseudocode below.

```
    If (N < thresh_C) Then
        M3 = N / thresh_C    // not enough features
    Else
        M3 = 1    // enough features
    End if
```

When using FAST corner detection (with a specific set of parameters), empirical experimentation shows that thresh_C and may be set at 0.05*L, wherein L is the length of the longer side of the image in pixels. For example, for an input camera image of size 320×240, thresh_C=160.

Other implementations for calculating M3 are also envisioned. In a video stream, a relative instead of an absolute measurement may be provided by comparing current value of N to the one in previous frames. N may also be compared to a value computed from some reference known to be a good example, etc. In the embodiment above, a clamped linear function is used, but one skilled in the art may envision using a different mapping function for mapping N to M3, e.g., non-linear function, a look-up table, etc.

To compute M4 (using blur module 216 of FIG. 7), pixel data is collected/retrieved from an image data stream buffer in memory at step 810. To increase computational efficiency, the image frame of interest is preferably downsampled so that feature detection can be performed in an efficient manner.

Once the image is downsampled, a blurring detection algorithm can be applied to the downsampled image to determine the extent of the blurring or detect whether there is too much blurring in the image. Although it is a basic image property, automatic identification and estimation of blur in images remains a difficult problem. In addition, the proposed solutions are often far from practical due to their complexity or computational cost.

Several types of image blur exist, such as motion blur, defocus blur, compression blur, Gaussian or low-pass filter blur, up-sampling blur, etc. In addition, blur generated by video encoding (e.g. MPEG-2 or H.264) can occur in video frames. However, for assessing still images taken by a phone camera, and not possessing compression or processing artifacts, many of these types of blur can be disregarded. In particular, blurring detection for accessing the suitability of an image frame being used as a reference image primarily concerns with motion blur and defocus blur.

The goal is to be able to discriminate blurry from non-blurry images. In addition, we aim to do this in an efficient manner. Thus, the detection of blurring or determination of the extent of blurring may be modeled as a classification problem (e.g., to simply decide whether there is too much blur or not too much blur). Accordingly, the disclosed blur detection method concentrates on identifying simple metrics that are indicative of image blur. Machine learning methods are more attractive for this classification problem, which can be trained to classify image descriptors into the desired classes.

When encountering a new image, a well-trained classifier can efficiently assign the appropriate class to the image with high certainty. In this regard, a similar approach is described in "R. Liu, Z. Li and J. Jia, Image Partial Blur Detection and Classication, IEEE Conference on Computer Vision and Pattern Recognition, 2008." However, to achieve better efficiency, the improved descriptors for blur detection used in the embodiments of the disclosure are more compact and more suited to this purpose in which mostly motion and defocus blur are encountered. In addition, preliminary results of the improved descriptors are better than ones presented in the paper. On a sample set of 150 images (i.e. 75 per class), we have reached a recognition rate of 87%.

In particular, four different image measurements associated with blurring detection are extracted from image frame (e.g., at step 810), where the measurements are associated with visual as well as spectral data from the image frame. The measurements are based upon similar observations of blur phenomenon in images, namely that intensity differences in the image are consequently smaller, that high frequencies have been attenuated and that gradient distribution profiles are less uniform. The four descriptors, whose exemplary implementations are described below, may be computed from grayscale images. One skilled in the art would appreciate that at least one of the descriptors may be used for blur detection.

(1) Gradient histogram energy: this descriptor may be based on the expectation that gradient magnitude distributions in regular images have longer tails than in blurry ones. Images may be convolved with Gaussian derivative filters in x- and y-directions and gradient magnitude is computed from the results.

A small filter scale may be appropriate. Sigma=0.5 pixels may be used (relative to the down-sampled version of the image, with long side being 640 pixels). The gradient magnitude values are then binned into a, e.g., 32-bin histogram and a sum of the values in the, e.g., last 50% of the bins is taken as the measurement. The value may be normalized with respect to image size.

(2) DCT coefficient magnitude: this measurement may be a consequence of the fact that blurry images lack high-frequency components. The method may compute a 2D Discrete Cosine Transform (DCT) of images and compute the number of locations which have a signal magnitude smaller than 1. This number may be normalized with respect to image size.

(3) Mean intensity difference: based on the assumption that intensity profiles in blurry images are smoothed out. Assuming that the object of interest usually appears in the middle of the image, only the middle, e.g., 50% of its area is examined. The method may compute the difference between neighboring pixels in the x- and y-direction and takes the average over all pixels in the area. This may result in two numbers, whereas all other measurements are described by a single number.

(4) Marziliano metric: an extension of the above mean intensity difference in y-direction. The method may use the metric as described in "P. Marziliano, F. Dufaux, S. Winkler and T. Ebrahimi, A no-reference perceptual blur metric, International Conference on Image Processing, 2002". This metric captures the spread of vertical image edges by computing the difference between local extremes around each edge. The final metric may be obtained by taking the average of local measurements.

In order to train a classifier, the measurements are stored in a matrix M, accompanied with manually selected labels vector L. In the method, the measurements can be considered separately or in combination. Then a linear discriminant classifier may be trained to learn posterior class probabilities using a cross-validation process. For discrimination, a Fisher discriminant classifier may be used, which maximizes the separability between two classes based on the ratio of between-class variance and within-class variance. Alternatively, other classifiers such as Support Vector Machines (SVM) or simple generative classifiers (modeling class-conditional probabilities) such as Linear Discriminative Classifier (LDC) or Quadratic Discriminative Classifier (QDC) may be used.

The output of the classifier, after the appropriate conversion, is a confidence of class label, ranging from 0 to 1. The confidence is used as M4. Therefore, M4 is a continuous and normalized value such as M1-M3, although it represents the confidence about the decision and not the degree of blur per se (however, the two are likely correlated). Other implementations for calculating M4 is also envisioned. For instance, M4 can be a binary label or a confidence value, a distance to the decision boundary of a classifier, etc.

One skilled in the art would appreciate that other measurements may be made at step 820, and a determination on the measurement information/score may be made at decision point 822, using similar methods as described above, to generate measurement MX, and so on.

Preferably, a calculation module takes the plurality of measurements into account to produce at least one augmentability information or score, which indicates the suitability of the image frame for use as a reference image. One example of a calculation for the augmentability information/score M is to find the minimum of applicable measurements (e.g., M=min(M1, M2, M3, M4, . . . MX, M=min (M1, M2), M=min (M1, M3, M4), and so on). Another example is to use a rule-based decision tree that sets the value of M based on certain rules and conditions on the measurements. Yet another example is to find and use a (weighted) average of all the measurements. If one augmentability information/score is generated, the combination of applicable measurements may be less intrusive to the application user, while also making it more difficult for someone to reverse engineer the system. On the other hand, if more than one augmentability information/score is generated (i.e., separating some measurements from another) a break-up into individual measurements may be advantageous because a user may understand better which aspect of the image he/she should try to improve.

One skilled in the art would appreciate that the measurements and augmentability information may be focused or localized on a specific portion of an image frame. For example, the augmentability information may be focused or restricted to a portion of the image where defects are detected (e.g., not enough features, blurring), and the feedback generated based on that augmentability information is generated and presented in a way that indicates that particular portion of the image having those defects (e.g., via a graphic such as a box or circle around the portion of the image).

The augmentability information/score is provided to a feedback generator (i.e., as an input) such that some form of feedback is provided to the user. Based on the augmentability information/score, a feedback generator function produces feedback that would indicate to a user the augmentability of the image frame. Feedback may take many forms: rendering graphical user interface element (visual), playing a sound clip (audio), vibrating the user device (haptic), rendering a text message or list of text messages (visual/textual), etc. Some types of feedback have a substantially continuous output (preferably based on a substantially continuous input augmentability information/score), whereas some types of feedback have a discrete output (e.g., good, OK, bad).

Figure 9B:
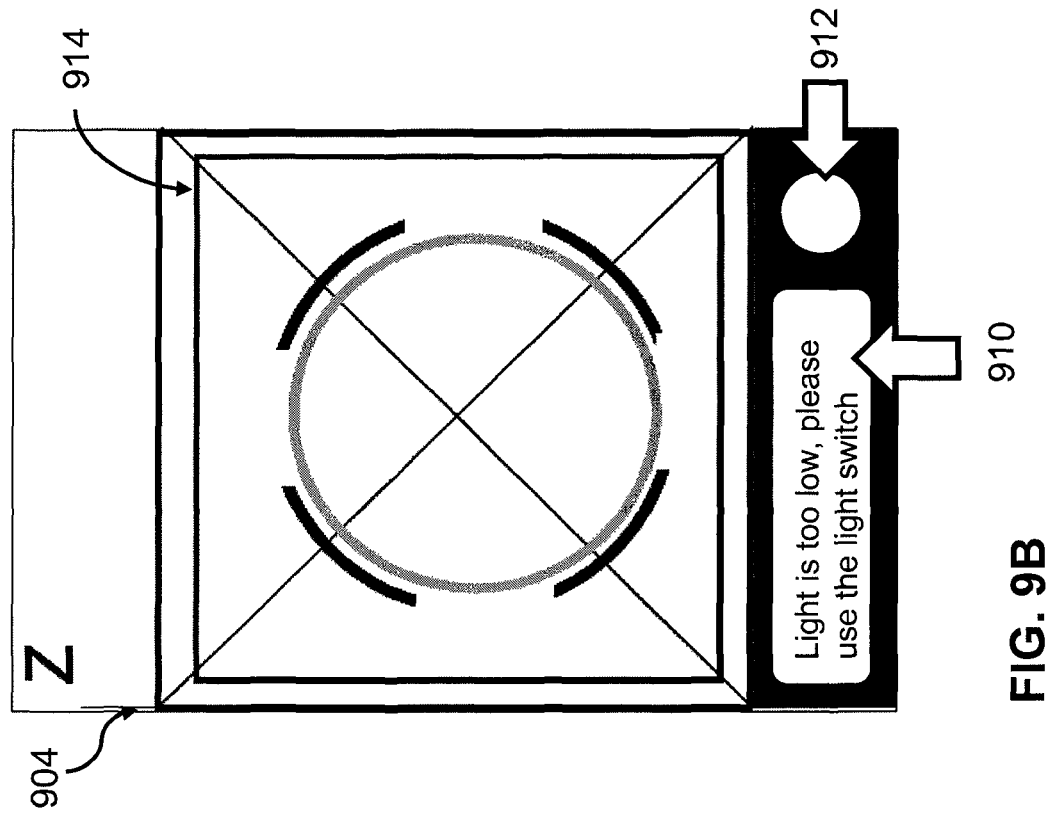
FIGS. 9A-B show illustrative screens with graphical user interface elements generated on the basis of the augmentability of an image frame in "live mode" and "still mode" respectively, according to one embodiment of the present disclosure.
Figure 9A:
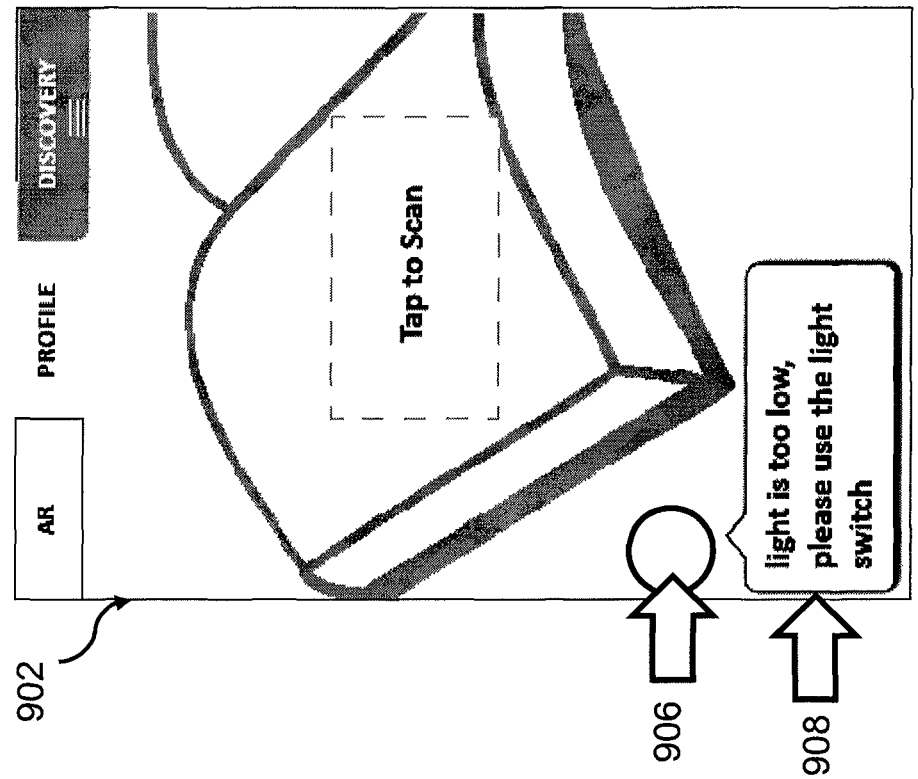

FIGS. 9A-B show illustrative screens with graphical user interface elements generated on the basis of the augmentability of an image frame in "live mode" and "still mode" respectively, according to one embodiment of the present disclosure.

Screen 902 shows a user device in "live mode" wherein a camera view is generated and displayed to the user via the display output part of the user device. While in camera view, a user can move the user device and digital imaging part to capture a stream of image frames of the surroundings. As the user is using the camera view, the image frames may be assessed for augmentability/suitability using the methods and systems disclosed herein. The resulting augmentability information is used as an input to generate graphical user interface element(s), such as element 906 and element 908. Element 906 may be a graphical user interface element showing thumbs up logo if the augmentability information of that image frame is above a particular threshold. Element 908 may be a graphical user interface element showing a text string that provides feedback to the user regarding the augmentability of the image frame. The text string rendered may be selected from a collection of text strings based on the augmentability information/score.

Screen 904 shows a user device in "still mode" where a user may have pressed a "shutter" button to capture a specific image frame for consideration as a reference image frame. The specific (still) image frame is displayed in region 914 (for illustration purposes, an image frame is not shown, but only a placeholder graphic is shown). The specific image frame is assessed for augmentability using methods and systems described herein. Similar graphical user interface element(s), i.e., element 912 and 910, are generated similarly to elements 906 and element 908.

FIG. 10A shows an exemplary (continuous) ruler gauge that may have a ticker or marker that moves along the gauge to indicate the level of suitability of an image frame being used as a reference image. Left may indicate low suitability and right may indicate high suitability. The rule gauge is an example of a continuous visual output that maps onto a continuous input augmentability information/score. Variations on the substantially continuous augmentability information/score (e.g., taking on values between 0.00 to 1.00) are displayed as variations on the position of the ticker/marker on the gauge (wherein possible positions of the ticker are also substantially continuous). Accordingly, a visually continuous visual indicator is generated and produced. A continuous visual indicator that responds to changes in continuous input may give user a stronger impression that the application responds to their actions, making user interaction more responsive, smoother and more intuitive. Continuous visual indicator may also be more difficult to reverse-engineer. FIG. 10B shows another exemplary level gauge that has a relative more discrete visual output, wherein the number of "tabs" of one color indicates the level of suitability of the image.

FIG. 10C shows an exemplary visual indicator that is generated based on the augmentability information. The visibility, color and/or contrast of elements in the logo changes as the augmentability information changes. On the left, the logo appears overall too dark and not visually appealing. This logo may indicate to the user that the image frame is not bright enough to be suitable for use as a reference image. In the middle, the logo appears under saturated and washed out. This logo may also indicate to the user that image frame is also not suitable. Lastly, on the right, the logo appears clear, which may indicate to the user that the image frame is suitable for use as a reference image. Effectively, the indicator image (logo) is generated as a graphical user interface element based on the augmentability information. Said graphical user interface element may be transformed in different ways depending on the augmentability information. Ideally, the image would be displayed in its original logo colors if the image is most suitable for use as a reference image. If the image is not suitable, the image would be displayed in undesirable logo colors.

FIG. 10D shows yet another exemplary visual indicator that is generated on the basis of the augmentability information. For example, a low augmentability information/score may lead to the visual element to be generated and rendered in red. As the augmentability information/score increases, the visual element fades to a yellow color to indicate that the suitability is increasing (getting better). When the augmentability information/score increases further, the visual element fades to a green color to indicate that the image frame is suitable for augmentability. FIGS. 10E, 10F, and 10G show other exemplary visual indicators whereby discrete visual output is used to indicate suitability. In FIG. 10E, a "happy face", "neutral face", "sad face" is used. For example, augmentability information/score being with a certain threshold would cause a certain face to be generated and rendered for display as a graphical user interface element. In FIG. 10F, instead of using different faces, number of stars displayed corresponds to different levels of suitability. For example, a particular number of stars is displayed if the augmentability information/score falls within a certain threshold. In FIG. 10G shows a numerical score (having substantially continuous range of values) is generated as part of a graphical user interface element and displayed to the user.

One embodiment of the disclosure may be implemented as a program product for use with a computer system. The program(s) of the program product define functions of the embodiments (including the methods described herein) and can be contained on a variety of computer-readable storage media. The computer-readable storage media can be a non-transitory storage medium. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:
1. A method for providing augmentability feedback to a user of a user device, said user device comprising a client, a processor, a digital imaging part, a memory storage, a motion sensor and an output part, said method comprising:

retrieving an image frame from the memory storage, said image frame being a digital image of a target object captured by the digital imaging part;

retrieving blurring data from at least one of: the motion sensor, a camera parameter from the digital imaging part, and the image frame;

determining, in the processor, image information associated with the image frame on a basis of the retrieved image frame, said image information indicative of a quality of features associated with the target object;

determining blurring information associated with the user device and/or the target object on a basis of the blurring data, said blurring information indicative of the quality of the features associated with the target object; and generating augmentability feedback for the user on the basis of the image information and the blurring information, said augmentability feedback producible via the output part of the user device:

wherein:

said augmentability feedback represents a suitability of the image frame for use as a reference image in an object recognition and/or vision-based tracking system;

the blurring data comprises at least one of: acceleration data, orientation data, data from an accelerometer, and data from a gyroscope of the user device; and determining blurring information comprises:

comparing at least a part of the blurring data with at least one threshold value retrieved from the memory storage;

determining a magnitude of the acceleration data and/or a magnitude of rotational rate data from the blurring data;

comparing the magnitude of the acceleration data with a first threshold value for acceleration and/or the magnitude of the rotational rate data with a second threshold value for rotational rate, said first and second threshold values being retrieved from the memory storage; and if the magnitude of the acceleration data is greater than the first threshold value and/or the magnitude of the rotational rate data is greater than the second threshold value, then the method comprises setting a motion score to one of two possible values, else the method comprises setting the motion score to another of the two possible values, wherein said blurring information is based on the motion score.

2. The method of claim 1, further comprising:

determining an augmentability score based on the image information and the blurring information, wherein said augmentability feedback comprises a first graphical user interface element generated on the basis of the augmentability score as an input value, and the method further comprising:

rendering the first graphical user interface element for display on the output part, wherein the output part is a display output part of the user device;

and wherein said augmentability feedback comprises a second graphical user interface element and/or a third graphical user interface element, each element generated on a basis of at least part of blurring information and/or image information as an input value, the method further comprising:

rendering the second and third graphical user interface elements for display on the output part, wherein the output part is a display output part of the user device;

retrieving a text string from a plurality of text strings stored in the memory storage on a basis of at least one of: the blurring information and image information, wherein the augmentability feedback comprises a fourth graphical user interface element having the text string, and the method further comprising:

rendering the fourth graphic user interface element for display in the output part, wherein the output part is a display output part of the user device.

3. The method according to claim 1, further comprising:

determining an augmentability score based on the image information and the blurring information, wherein said augmentability feedback comprises a first graphical user interface element generated on the basis of the augmentability score as an input value; and rendering the first graphical user interface element for display on the output part, wherein the output part is a display output part of the user device.

4. The method according to claim 3, wherein:

said augmentability feedback comprises a second graphical user interface element and/or a third graphical user interface element, each element generated on the basis of at least part of blurring information and/or image information as an input value; and the method further comprising rendering the second and third graphical user interface elements for display on the output part, wherein the output part is a display output part of the user device.

5. The method according to claim 4, wherein at least one of the graphical user interface element(s) is configured to receive the input value having a substantially continuous scale be rendered with a substantially continuous visual range of visual output when displayed, wherein said substantially continuous visual range of visual output maps to said input value.

6. The method according to claim 4, further comprising:

retrieving a text string from a plurality of text strings stored in the memory storage on the basis of at least one of: the blurring information and image information, wherein the augmentability feedback comprises a fourth graphical user interface element having the text string; and rendering the fourth graphic user interface element for display in the output part, wherein the output part is a display output part of the user device.

7. The method according to claim 1, further comprising a step of:

comparing at least one of or a derivation of at least one of blurring information and image information with at least one threshold value retrieved from the memory storage, wherein the augmentability feedback comprises an audio clip and/or haptic output through the output part, said output part comprising an audio and/or an haptic output part of the user device, respectively, said augmentability feedback generated on the basis of the comparing step.

8. The method according to claim 1, wherein:

the blurring Information is determined on the basis of blurring data from the image frame, said blurring Information Indicative of a presence of defocus and/or motion blur in the image frame; and the blurring information comprises:
 processing the image frame to calculate extent of defocus and/or motion blur of the image frame; and
 comparing the extent with a third threshold value for blurring, said third threshold value being retrieved from a non-transitory computer readable storage medium;
 wherein if the extent is greater than the third threshold value, then the blurring information has one of two values, else the blurring information has another of two values.

9. The method according to claim 8, wherein determining image information comprises:
 sampling pixels of the image frame for luminance values;
 accumulating the luminance values of the sampled pixels in a histogram with a fixed number of bins corresponding to a spectrum from low to high luminance values;
 tabulating a number of dark luminance values (pix_D) accumulated in a first subset of the bins on a lower end of the spectrum and a number of light luminance values (pix_L) accumulated in a second subset of the bins on a higher end of the spectrum; and
 comparing the number of dark luminance values (pix_D) relative to a total number of sampled luminance values (pix_T) with a fourth threshold value for darkness (thresh_D) and the number of light luminance values (pix_L) relative to the total number of sampled luminance values (pix_T) with a fifth threshold value for lightness (thresh_L), said fourth and fifth threshold values (thresh_D, thresh_L) being retrieved from the non-transitory computer readable storage medium;
 wherein:
  if the number of dark luminance values is greater than the fourth threshold value, then a darkness score has a value of $((pix\_D/pix\_T-1)*(1/(thresh\_D-1))$, else the darkness score has a value of 1; and
  if the number of light luminance values is less than the fifth threshold value, then a lightness score has a value of $((pix\_L/pix\_T-1)*(1/(thresh\_L-1)))$, else the lightness score has a value of 1,
 and wherein the image information is based on the minimum of the darkness score and the lightness score.

10. The method according to claim 9, wherein determining image information comprises:
 processing the image frame to detect corner and/or line features and counting said detected features to determine a feature count (count_F); and
 comparing the feature count with a sixth threshold value for features (thresh_F), said sixth threshold value being retrieved from the non-transitory computer readable storage medium,
 wherein
  if the feature count is smaller than the sixth threshold value (thresh_F), then a feature score has a value of count_F/thresh_F, else the feature score has a value of 1; and
  the image information is based on said feature score.

11. The method according to claim 1, wherein determining the image information comprises tabulating luminance values sampled from the image frame.

12. A user device comprising a client including a processor, a digital imaging part, a memory storage, a motion sensor and an output part all of which are operably connected together, the processor configured to:
 retrieve an image frame from the memory storage, said image frame being a digital image of a target object captured by the digital imaging part;
 retrieve blurring data from at least one of: the motion sensor, a camera parameter from the digital imaging part, and the image frame;
 determine, in the processor, image information associated with the image frame on a basis of the retrieved image frame, said image information indicative of a quality of features associated with the target object;
 determine blurring information associated with the user device and/or the target object on the basis of the blurring data, said blurring information indicative of the quality of the features associated with the target object; and
 generate augmentability feedback for the user on the basis of the image information and the blurring information, said augmentability feedback producible via the output part of the user device,
 wherein:
  said augmentability feedback represents a suitability of the image frame for use as a reference image in an object recognition and/or vision-based tracking system;
  the blurring data comprises at least one of: acceleration data, orientation data, data from an accelerometer, and data from a gyroscope of the device; and
  the processor is configured to determine the blurring data by:
   comparing at least a part of the blurring data with at least one threshold value retrieved from the memory storage;
   determining a magnitude of the acceleration data and/or a magnitude of rotational rate data from the blurring data;
   comparing the magnitude of the acceleration data with a first threshold value for acceleration and/or the magnitude of the rotational rate data with a second threshold value for rotational rate, said first and second threshold values being retrieved from the memory storage; and
   if the magnitude of the acceleration data is greater than the first threshold value and/or the magnitude of the rotational rate data is greater than the second threshold value, then the processor is configured to set a motion score to one of two possible values, else the processor is configured to set the motion score to another of the two possible values, wherein said blurring information is based on the motion score.

13. The user device according to claim 12 and a system configured to enable recognition of target objects in image frames and storage of augmented reality content associated with said target objects.

14. A computer program product comprising a non-transitory computer readable storage medium for storing a computer program, the computer program executed by a computer to perform a method comprising:
 retrieving an image frame from a memory storage, said image frame being a digital image of a target object captured by a digital imaging part;
 retrieving blurring data from at least one of: a motion sensor, a camera parameter from the digital imaging part, and the image frame;
 determining, in a processor, image information associated with the image frame on a basis of the retrieved image frame, said image information indicative of a quality of features associated with the target object;
 determining blurring information associated with a user device and/or the target object on the basis of the blurring data, said blurring information indicative of the quality of the features associated with the target object; and generating augmentability feedback for a user on the basis of the image information and the blurring information, said augmentability feedback producible via an output part of the user device, wherein:
   said augmentability feedback represents a suitability of the image frame for use as a reference image in an object recognition and/or vision-based tracking system the blurring data comprises at least one of: acceleration data, orientation data, data from an accelerometer, and data from a gyroscope of the user device; and determining blurring information comprises:
      comparing at least a part of the blurring data with at least one threshold value retrieved from the memory storage;

determining a magnitude of the acceleration data and/or a magnitude of rotational rate data from the blurring data;

comparing the magnitude of the acceleration data with a first threshold value for acceleration and/or the magnitude of the rotational rate data with a second threshold value for rotational rate, said first and second threshold values being retrieved from the memory storage; and if the magnitude of the acceleration data is greater than the first threshold value and/or the magnitude of the rotational rate data is greater than the second threshold value, then the method comprise setting a motion score to one of two possible values, else the method comprises setting the motion score to another of the two possible values, wherein said blurring information is based on the motion score.

* * * * *